(12) United States Patent
Bennett

(10) Patent No.: US 10,890,211 B2
(45) Date of Patent: Jan. 12, 2021

(54) DYNAMIC BEARING

(71) Applicant: Safran Landing Systems UK LTD, Gloucester (GB)

(72) Inventor: Ian Robert Bennett, Gloucester (GB)

(73) Assignee: Safran Landing Systems UK LTD

(*) Notice: Subject to any disclaimer, the term of this patent is extended or adjusted under 35 U.S.C. 154(b) by 117 days.

(21) Appl. No.: 15/497,642

(22) Filed: Apr. 26, 2017

(65) Prior Publication Data

US 2017/0227051 A1    Aug. 10, 2017

Related U.S. Application Data

(63) Continuation of application No. 14/785,117, filed as application No. PCT/GB2014/051041 on Apr. 3, 2014, now abandoned.

(30) Foreign Application Priority Data

Apr. 17, 2013 (GB) .................................. 1306909.1

(51) Int. Cl.
| F16C 17/02 | (2006.01) |
| F16C 33/12 | (2006.01) |
| B64C 25/00 | (2006.01) |
| F16C 33/10 | (2006.01) |
| B64D 45/02 | (2006.01) |

(52) U.S. Cl.
CPC ............ F16C 17/02 (2013.01); B64C 25/001 (2013.01); B64D 45/02 (2013.01); F16C 33/102 (2013.01); F16C 33/1065 (2013.01); F16C 33/1095 (2013.01); F16C 33/121 (2013.01);

(Continued)

(58) Field of Classification Search
CPC ........ F16C 17/00; F16C 17/02; F16C 17/025; F16C 17/045; F16C 17/102–17/107; F16C 33/101; F16C 33/1015; F16C 33/1065; F16C 35/02; F16C 2326/43; F16C 2204/12; F16C 33/12; F16C 33/1095; B64C 25/001; B64C 25/34; B64C 25/00; B64D 45/02
See application file for complete search history.

(56) References Cited

U.S. PATENT DOCUMENTS

| 2,558,598 A | 6/1951 | Wightman |
| 2,572,021 A | 10/1951 | Folz |

(Continued)

FOREIGN PATENT DOCUMENTS

| EP | 1288512 A2 | 3/2003 |
| EP | 1582776 A2 | 10/2005 |

(Continued)

OTHER PUBLICATIONS

Great Britain Search Report dated Sep. 30, 2013 in Great Britain Application No. GB1306909.1—7 Pages.

(Continued)

*Primary Examiner* — Alan B Waits
(74) *Attorney, Agent, or Firm* — RatnerPrestia

(57) ABSTRACT

A dynamic bearing for an aircraft landing gear. The bearing comprises a lug, a shaft comprising a first material, and a bearing surface comprising a second material that is softer than the first material. The bearing surface defines a bore and is arranged to support the shaft when the shaft is movably housed within the bore in use. The bearing surface is defined by the lug or a coating applied to the lug.

20 Claims, 3 Drawing Sheets

(52) U.S. Cl.
CPC ........ *F16C 33/125* (2013.01); *F16C 2204/12* (2013.01); *F16C 2326/43* (2013.01)

(56) References Cited

U.S. PATENT DOCUMENTS

| | | | |
|---|---|---|---|
| 3,238,000 A | 3/1966 | Muijderman | |
| 3,517,973 A | 6/1970 | Hirs | |
| 3,881,788 A | 5/1975 | Kotauczek | |
| 3,945,695 A | 3/1976 | Speakman | |
| 3,947,075 A | 3/1976 | Ewertz | |
| 4,226,686 A | 10/1980 | Hustler | |
| 4,576,488 A | 3/1986 | Steiner et al. | |
| 4,853,099 A | 8/1989 | Smith | |
| 5,094,548 A | 3/1992 | Danly | |
| 5,543,236 A | 8/1996 | Tanaka et al. | |
| 5,660,482 A | 8/1997 | Newley et al. | |
| 5,707,155 A | 1/1998 | Banfield et al. | |
| 5,857,318 A | 1/1999 | Odai et al. | |
| 5,895,516 A | 4/1999 | Tanaka et al. | |
| 6,131,852 A * | 10/2000 | Holloway | B64C 25/14 244/102 R |
| 6,332,902 B1 | 11/2001 | Takayama et al. | |
| 6,409,121 B1 | 6/2002 | Lindahl | |
| 6,513,238 B1 * | 2/2003 | Schlegel | F16C 7/023 29/888.09 |
| 6,585,419 B2 | 7/2003 | Ono et al. | |
| 6,742,259 B2 | 6/2004 | Thompson | |
| 6,764,590 B1 | 7/2004 | Cochran | |
| 6,905,617 B2 | 6/2005 | Chang et al. | |
| 6,991,377 B2 | 1/2006 | Yamamoto et al. | |
| 7,234,871 B2 | 6/2007 | Maruyama et al. | |
| 8,096,709 B2 | 1/2012 | Maruyama et al. | |
| 8,104,966 B2 | 1/2012 | Yamamoto et al. | |
| 8,297,150 B2 | 10/2012 | Dismon et al. | |
| 8,550,719 B2 | 10/2013 | Laing et al. | |
| 8,845,199 B2 | 9/2014 | Haedicke et al. | |
| 9,222,511 B2 | 12/2015 | Lee et al. | |
| 9,255,604 B2 | 2/2016 | Tanaka et al. | |
| 9,863,455 B2 * | 1/2018 | Green | F16C 11/02 |
| 2002/0061146 A1 | 5/2002 | Ono et al. | |
| 2002/0126924 A1 | 9/2002 | Okamoto et al. | |
| 2003/0039420 A1 | 2/2003 | Davies et al. | |
| 2003/0085321 A1 | 5/2003 | Reniau | |
| 2003/0190102 A1 | 10/2003 | Horng et al. | |
| 2005/0133663 A1 | 6/2005 | Fondriest | |
| 2007/0194172 A1 | 8/2007 | Luce et al. | |
| 2008/0112658 A1 | 5/2008 | Justin | |
| 2008/0152271 A1 | 6/2008 | Barlerin | |
| 2008/0217107 A1 | 9/2008 | Schmidt | |
| 2010/0002968 A1 | 1/2010 | Mergen | |
| 2011/0235955 A1 | 9/2011 | Lee et al. | |
| 2012/0315079 A1 | 12/2012 | Nuechterlein | |
| 2014/0305399 A1 * | 10/2014 | Pegg | F16C 33/105 123/193.5 |
| 2015/0137486 A1 | 5/2015 | Smith et al. | |

FOREIGN PATENT DOCUMENTS

| | | |
|---|---|---|
| EP | 1617090 A2 | 1/2006 |
| FR | 738343 A | 12/1932 |
| GB | 340251 | 12/1930 |
| GB | 1464177 | 2/1977 |
| JP | 6165910 A | 4/1986 |
| JP | 01150296 A | 6/1989 |
| JP | 11210752 A | 8/1999 |

OTHER PUBLICATIONS

International Preliminary Report on Patentability for International Application No. PCT/GB2014/051041, dated Oct. 20, 2015—8 Pages.

International Search Report and Written Opinion for International Application No. PCT/GB2014/051041, dated Jul. 25, 2014—4 Pages.

Entire patent prosecution history of U.S. Appl. No. 14/785,117, filed, Oct. 16, 2015, entitled, "Dynamic Bearing."

\* cited by examiner

DYNAMIC BEARING

This application is a continuation of U.S. application Ser. No. 14/785,117, filed Oct. 16, 2015, which is a national stage of International Application No. PCT/GB2014/051041, filed Apr. 3, 2014, which claims the benefit of GB 1306909.1, filed Apr. 17, 2013, both of which are incorporated by reference herein. This application claims priority to and the benefit of the foregoing applications, and the foregoing applications are incorporated herein by reference.

BACKGROUND

A dynamic bearing enables constrained relative movement between two parts. Dynamic bearings can be found in many assemblies, such as aircraft landing gear, which require a bearing surface on a dynamic joint.

Generally, a dynamic bearing includes a lug which defines a lug bore. A bush is disposed within the lug bore, the bush defining a bush bore which has a narrower diameter than the lug bore and is arranged to receive a shaft. The bush is arranged to support the shaft in use. The bush may be retained in position due to an interference fit with the lug or may be mechanically fixed to the lug by a bolt or the like. The bush is formed of a softer material than the shaft so as to be relatively sacrificial with respect to the shaft. Once worn, the bush can be replaced without requiring replacement of the lug or shaft.

The present inventor has realised that known dynamic bearings may be improved in one or more of the following ways:
increased robustness;
reduced weight;
improved corrosion resistance;
improved fretting resistance; and
improved lightning protection.

SUMMARY

According to a first aspect of the invention, there is provided a dynamic bearing suitable for an aircraft landing gear, the dynamic bearing comprising:
a lug;
a shaft comprising a first material;
a bearing surface comprising a second material that is softer than the first material, the bearing surface defining a bore and being arranged to support the shaft when the shaft is movably housed within the bore in use,
wherein the bearing surface is defined by the lug or by a coating applied to the lug.

Thus, the bearing surface is either defined by the lug itself, or by a coating that is applied to the lug. As such, the dynamic bearing according to the first aspect does not require a bush to be provided between the shaft and the lug. The inventor has found that the interface between the coating and the lug is less likely to result in rotation or migration of the bearing surface in comparison to the interface between a lug and bush. The dynamic bearing according to the first aspect may therefore provide for a more robust dynamic bearing that may be lighter than prior art bearings due to it not including a bush. Moreover, the corrosion resistance of the bearing may be improved due to the removal of the lug-bush interface, which is a primary location for corrosion and fretting of the lug. Moreover, the dynamic bearing according to the first aspect may have improved electrical conductivity across the bearing relative to prior art bearings including a lug-bush interface, which is advantageous for lightning protection.

The outer surface of the shaft may include one or more first ducts for the passage of lubricant. This may reduce friction between the bearing surface and the shaft.

The first ducts may be disposed in parallel around the peripheral surface of the shaft.

In some embodiments the shaft may in use have a loaded surface portion carrying tension stress substantially parallel the shaft axis, and an unloaded surface portion carrying compression stress substantially parallel to the shaft axis, and the first ducts may be provided in side portions between the centres of the loaded and unloaded surface portions, where axial stress is reduced. The surface portions may be elongate.

One or more of the first ducts may be arranged to extend so as to be generally parallel with respect to the dominant stress in the shaft.

In embodiments where the dynamic bearing is arranged such that the dominant load experienced by the shaft is a bending moment, the dominant stress angle in the shaft will be generally parallel with respect to the longitudinal axis L of the shaft. Thus, in some embodiments, one or more of the first ducts may extend lengthwise generally parallel with respect to the longitudinal axis L of the shaft such that the first ducts are generally aligned with the dominant stress in the shaft, which may reduce the likelihood of the first ducts presenting a stress raiser problem.

In embodiments where the dynamic bearing is arranged such that the shaft experiences combined bending and torsional moments, the dominant stress angle in the shaft will be at a non-zero angle with respect to the longitudinal axis L of the shaft. Thus, in some embodiments, one or more of the first ducts may extend lengthwise at an angle of up to 45° with respect to the longitudinal axis L of the shaft such that the first ducts are generally aligned with the stress resulting from the combination of bending and torsional loads on the shaft. In some embodiments one or more of the first ducts may extend lengthwise at an angle of up to 25°, up to 10° and even more preferably up to 5° with respect to the longitudinal axis L of the shaft.

The bearing surface may include one or more second ducts for the passage of lubricant. This may reduce friction between the bearing surface and the shaft. The one or more second ducts may be arranged to enable the passage of lubricant from a lubrication point to the first ducts via the bearing interface. Thus, the first and second ducts together define a lubrication network arranged to lubricate the bearing surface.

The first ducts may be arranged to accept lubricant from second ducts in the lug and distribute grease along the bearing interface between the shaft and bearing surface.

One or more of the second ducts may extend lengthwise in a direction generally orthogonally with respect to the axis B of the bore defined by the bearing surface. Thus, the second ducts are generally aligned with the circumferential dominant stress in the lug and/or coating, which may reduce the likelihood of the second ducts presenting a stress raiser problem. The second ducts may extend generally circumferentially around the bore. In some embodiments one or more of the second ducts may extend lengthwise at an angle of no greater than $\tan^{-1} = (\text{lug width} - 3 \times \text{groove width})/\text{lug bore diameter}$.

One or more of the second ducts may extend depth-wise into the lug through the coating. This enables the second ducts to be deeper than the coating for improved grease transfer.

The first and/or second ducts may be open topped ducts; for example, a major portion of the first and/or second ducts may be open topped. This may improve fluid communication between the ducts. The first and/or second ducts may be arranged to generally retain grease or the like so as to slowly dispense grease to the interface between the shaft and bearing surface.

The second ducts may be arranged in fluid communication with a source of lubricant such as grease.

The coating may have a thickness of at least 0.05 mm. The coating may have a thickness between 0.1 mm and 10 mm, preferably between 0.1 mm and 5 mm, more preferably between 0.1 mm and 3 mm and even more preferably between 0.1 mm and 1 mm. A thickness of 0.1 mm provides for a reasonable amount of wear, but anything above 0.3 mm is likely to be outside the amount of wear expected in most embodiments. It may however be advantageous for the coating to be up to 1 mm to allow for edge wear. The coating thickness may be generally uniform.

Portions of the lug defining the extremities of the bore may be tapered to spread edge loading.

The first material may comprise any suitable hard material, such as steel, titanium or an anodised aluminium alloy.

The second material may comprise any suitable relatively soft material, such as bronze.

The second material may comprise a self lubricating material. This may reduce friction between the bearing surface and the shaft.

In some embodiments the shaft may be coated to improve its hardness; for example, a coating comprising chromium, or a carbide based coating such as WC—Co—Cr, or nickel or nickel alloy, or diamond like carbon. In such embodiments, it is preferred that the shaft coating is not applied to the first ducts due to the detrimental effect that the plating process may have on the fatigue resistance of the shaft.

According to a second aspect of the invention, there is provided an aircraft landing gear including a dynamic bearing according to the first aspect. The dynamic bearing according to the first aspect may for example define at least part of a drag stay, a retraction actuator, a steering cylinder, a pintle, or landing gear door linkage.

According to a third aspect of the invention, there is provided an aircraft comprising a dynamic bearing according to the first aspect and/or an aircraft landing gear according to the second aspect.

BRIEF DESCRIPTION OF THE DRAWINGS

Embodiments of the invention will now be described with reference to the accompanying drawings, in which.

DETAILED DESCRIPTION

Figure 1:
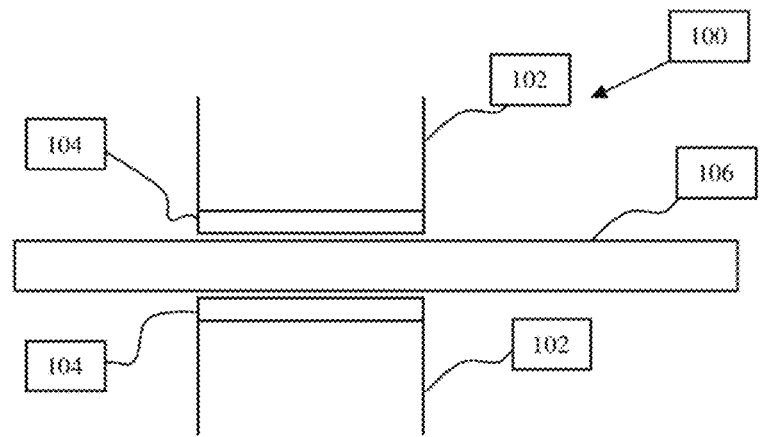
FIG. 1 is a schematic diagram of a prior art dynamic bearing.

FIG. 1 shows a prior art dynamic bearing 100. A structural component has a longitudinal axis Lx, and includes a lug 102 which defines a lug bore. A bush 104 is disposed within the lug bore, the bush 104 defining a bush bore which has a narrower diameter than the lug bore and is arranged to receive a shaft 106. The bush 104 is arranged to support the shaft 106 in use. The bush 104 may be retained in position due to an interference fit with the lug or may be mechanically fixed to the lug 102 by a cross bolt or the like. The bush 104 is formed of a softer material than the shaft 106 so as to be relatively sacrificial with respect to the shaft 106. Once worn, the bush 104 can be replaced without requiring replacement of the lug 102 or shaft 106.

The inventor has identified that the interface between the lug 102 and bush 104, which will be referred to as the "lug-bush interface", is prone to problems. These problems will now briefly be explained.

The bush 104 may rotate within the lug 102, or may migrate from its intended position. This can affect the normal working of the dynamic bearing 100.

The lug-bush interface may lead to corrosion or fretting. This is due to the fact that the lug 102 and bush 104 are separate components which are mechanically connected. Corrosion will typically affect the lug 102 and results from moisture ingress which enables ion migration between the lug 102 and bush 104. Fretting is a process of wear that occurs at the lug-bush interface, which is under load and subject to minute relative motion by vibration or other forces. Corrosion and fretting can be particularly problematic because the lug-bush interface is often difficult to inspect.

The lug-bush interface may also increase electrical resistance across the dynamic bearing 100. This can be problematic when the dynamic bearing 100 is for assemblies such as aircraft landing gear which may require lightning protection.

In order to satisfactorily be retained within the lug 102, the bush 104 has a wall thickness T of 2.5 mm to 4 mm. However, a relatively small thickness of the bush 104, such as 0.1 mm, is likely to be eroded due to wear during the life of the bush 104. The excess bush thickness adds to the weight of the dynamic bearing 100 and increases the bulk of it.

Figure 2:
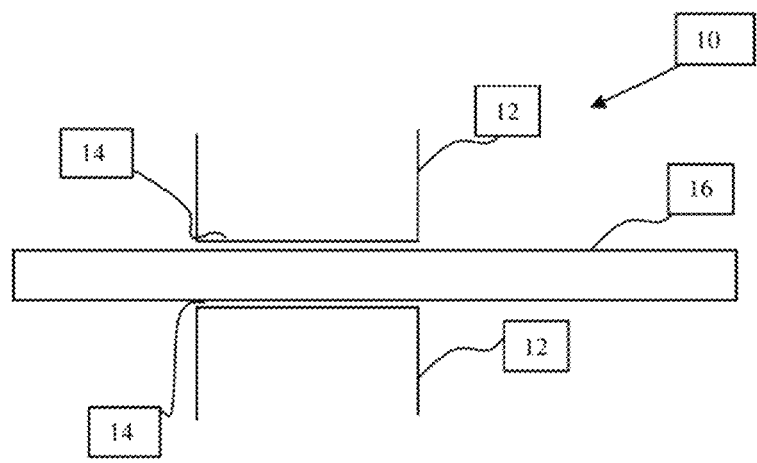
FIG. 2 is a schematic diagram of a dynamic bearing according to an embodiment of the invention.

FIG. 2 shows a dynamic bearing 10 according to an embodiment of the invention. The dynamic bearing 10 includes a lug 12 which may be defined by a structural component of an assembly such an aircraft landing gear. The lug 12 defines a generally cylindrical lug bore arranged to receive an elongate, generally cylindrical pin or shaft 16. The inner peripheral wall of the lug 12, which defines the lug bore, defines a bearing surface or counter face 14 arranged to support the shaft 16 when the shaft 16 is movably housed within the bore in use.

The shaft 16 is formed from a first material, which is harder than a second material from which the lug 12 is formed. Thus, the bearing surface 14 of the lug is relatively sacrificial with respect to the shaft 16.

Thus, the dynamic bearing 10 according to the illustrated embodiment of the invention provides a lug 12 which performs the function of both the lug and bush of a prior art bearing. As such, there is no lug-bush interface to give rise to the problems identified above with reference to FIG. 1, especially bush migration and lug corrosion/fretting. Although the lug 12 may be heavier than known lugs, due to it being formed from the second material, the inventor has found that in embodiments of the invention the advantage of the bearing surface being suitable for frequent application of high stresses outweighs the associated weight disadvantage. Such embodiments may be particularly well suited to joints such as a landing gear door linkage.

Figure 3:
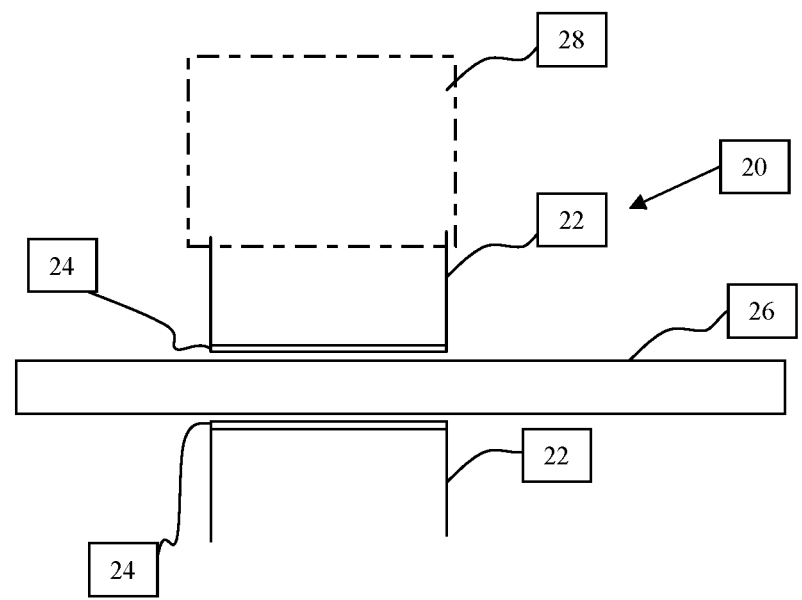
FIG. 3 is a schematic diagram of a dynamic bearing according to a further embodiment of the invention.

FIG. 3 shows a dynamic bearing 20 according to a further embodiment of the invention. The dynamic bearing 20 includes a lug 22 which may be defined by a structural component 28 of an assembly such an aircraft landing gear. The lug 22 defines a lug bore.

The inner peripheral wall of the lug 22, which defines the lug bore, is provided with a lug coating or plating 24 which defines a cylindrical bore arranged to receive an elongate, generally cylindrical pin or shaft 26 when the shaft 26 is movably housed within the bore in use. Thus, the bore-defining face of the coating 24 defines a bearing surface. The coating 24 may be applied by known techniques such as electroplating or metal spraying.

The shaft 26 is formed from a first material, which is harder than a second material from which the coating 24 is formed. Thus, the coating 24 is relatively sacrificial with respect to the shaft 26. The lug 22 may be formed from a conventional lug material such as steel or titanium.

Thus, the dynamic bearing 20 according to the illustrated embodiment of the invention provides a lug coating 24 which performs the function of the bush of a prior art bearing. The lug coating 24 is applied to the lug 22 and may in embodiments of the invention be applied by techniques such as those described below which result in a high bond strength between the lug coating 24 and lug 22. This reduces the likelihood of migration or rotation of the bearing surface in comparison to prior art dynamic bearings. Also, the bond at the lug-coating interface is less likely to permit moisture ingress in comparison to the lug-bush interface of prior art dynamic bearings.

Figure 4:
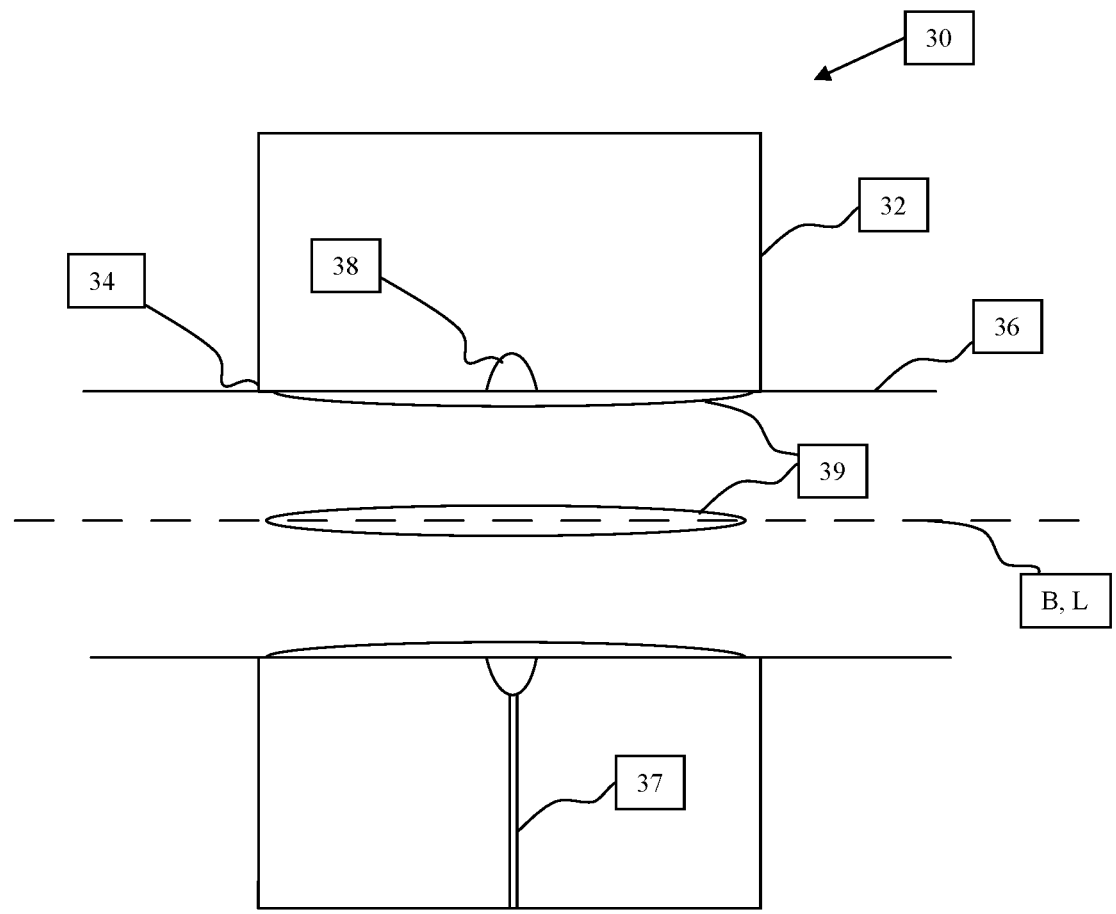
FIG. 4 is a schematic diagram of a dynamic bearing according to a further embodiment of the invention.

FIG. 4 shows a dynamic bearing 30 according to a further embodiment of the invention. The dynamic bearing 30 includes a lug 32 which may be defined by a structural component of an assembly such an aircraft landing gear. The lug 32 defines a lug bore arranged to receive a shaft 36. The inner peripheral wall of the lug 32, which defines the lug bore, provides a bearing surface 34 arranged to support the shaft 36 when the shaft 36 is movably housed within the bore in use.

The shaft 36 is formed from a first material, which is harder than a second material from which the lug 32 is formed. Thus, the bearing surface 34 of the lug is relatively sacrificial with respect to the shaft 36.

The dynamic bearing 30 also includes grease grooves or ducts 38, 39 arranged to enable lubricant to be distributed around and/or across the bearing surface 34. This may reduce friction between the bearing surface 34 and the shaft 36.

The outer surface of the shaft 36 includes a plurality of first ducts 39. The first ducts 39 extend lengthwise generally parallel with respect to the longitudinal axis L of the shaft 36. The dominant stress in a shaft 36 when used in a landing gear joint is generally a bending stress due to a bending moment. Thus, the first ducts 39 are generally aligned with the dominant stress in the shaft 36, which reduces the likelihood of the first ducts 39 presenting a stress raiser problem.

The first ducts 39 are disposed in parallel around the peripheral surface of the shaft 36. However in some embodiments, the shaft 36 may in use have a loaded surface portion carrying tension stress substantially parallel to the shaft axis, and an unloaded surface portion carrying compression stress substantially parallel to the shaft axis, and the first ducts 39 may be provided in side portions between the centres of the loaded and unloaded surface portions, where axial stress is reduced. This may be particularly advantageous in embodiments where the shaft 36 is arranged to be static relative to the load, with the lug 32 moving around it such as an application on a joint on a stay, where the shaft is static relative to one link of the stay, or on a torque link assembly if the shaft is fixed in rotation relative to the torque link.

The lug 32 includes a second duct 38. The second duct 38 is circumferential and extends lengthwise in a direction generally orthogonally with respect to the axis B of the bore defined by the bearing surface 34. The dominant stress in a lug is generally circumferential due to applied radial load placing the lug 32 in tension. Thus, the second duct 38 is generally aligned with the dominant stress in the lug 32, which reduces the likelihood of the second duct 38 presenting a stress concentration or stress raiser problem.

It is advantageous to provide the first ducts 39 in the shaft 36 rather than the lug 32 because, if corresponding first ducts 39 were provided in the lug 32, the first ducts 39 would extend so as to be generally orthogonal with respect to the dominant stress in the lug 32, meaning that the first ducts 39 would provide a stress raiser problem in the lug 32.

A lubricant such as grease is supplied to the ducts 38, 39 through a hole 37 in the lug 32 in a conventional manner, such as a grease nipple connected to the duct 38 through a passageway. The ducts 38, 39 are arranged to function as temporary reservoirs between lubrication intervals. In some embodiments the lubricant may be applied to one or more of the first ducts 39 and in use at least some of the lubricant will migrate to the second duct or ducts via the lubrication network defined by the ducts 38, 39. The ducts 38, 39 are preferably open topped to enable grease or the like to be exchanged between the ducts 38, 39.

Figure 5:
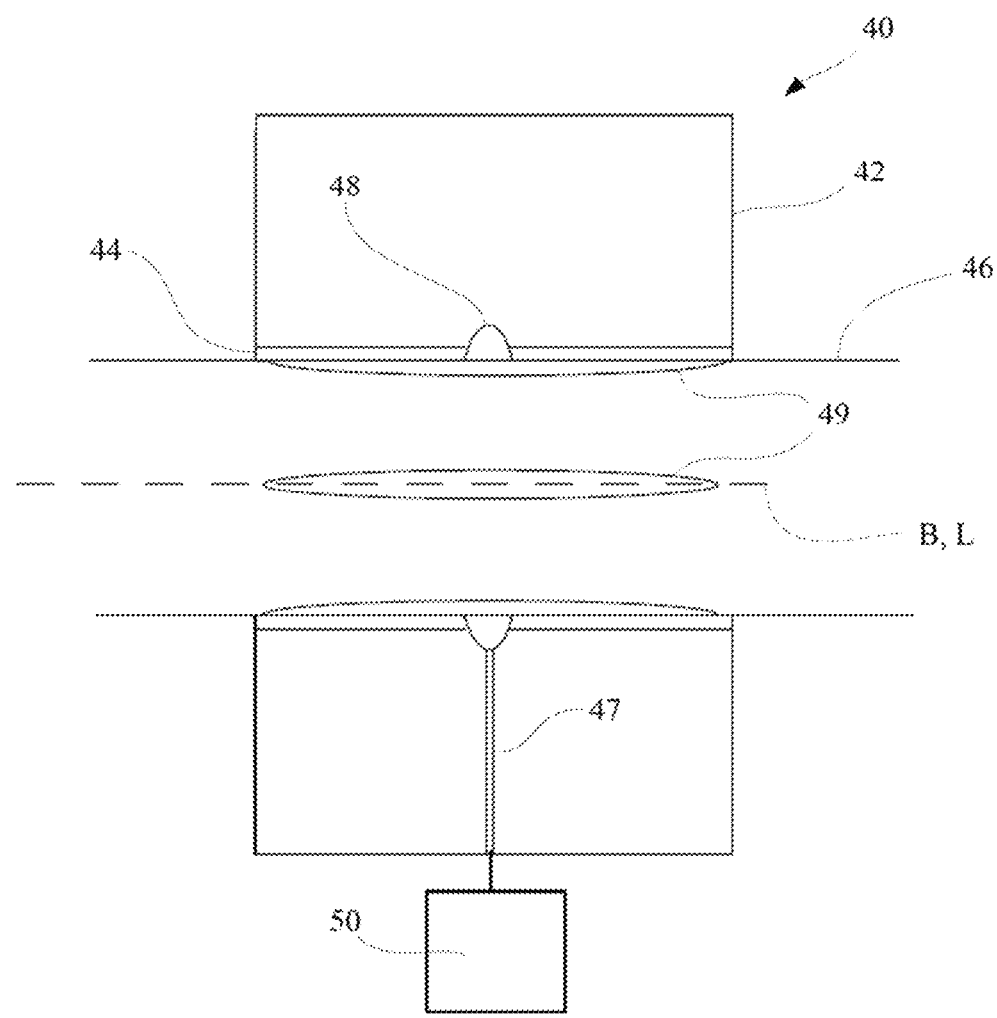
FIG. 5 is a schematic diagram of a dynamic bearing according to a further embodiment of the invention.

FIG. 5 shows a dynamic bearing 40 according to a further embodiment of the invention. The dynamic bearing 40 includes a lug 42 which may be defined by a structural component of an assembly such an aircraft landing gear. The lug 42 defines a lug bore.

The inner peripheral wall of the lug 42, which defines the lug bore, is provided with a lug coating or plating 44 which defines a cylindrical bore arranged to receive an elongate, generally cylindrical pin or shaft 46 when the shaft 46 is movably housed within the bore in use. Thus, the bore-defining face of the coating 44 defines a bearing surface. The lug coating 44 may be applied by known techniques such as electroplating or metal spraying.

The shaft 46 is formed from a first material, which is harder than a second material from which the lug coating 44 is formed. Thus, the coating 44 is relatively sacrificial with respect to the shaft 46. The lug 42 may be formed from a conventional lug material such as steel or titanium.

Thus, the dynamic bearing 40 according to the illustrated embodiment of the invention provides a lug coating 44 which performs the function of the bush of a prior art bearing. The coating that is applied to the lug 42 results in a high bond strength between the lug coating 44 and lug 42. This reduces the likelihood of migration or rotation of the bearing surface in comparison to prior art dynamic bearings. Also, the bond at the lug-coating interface is less likely to permit moisture ingress in comparison to the lug-bush interface of prior art dynamic bearings.

The dynamic bearing 40 also includes grease grooves or ducts 48, 49 arranged to enable lubricant to be distributed around and/or across the bearing surface 44. This may reduce friction between the bearing surface of the lug coating 44 and the shaft 46.

The outer surface of the shaft 46 includes a plurality of first ducts 49. The first ducts 49 extend lengthwise generally parallel with respect to the longitudinal axis L of the shaft 46. The dominant stress in a shaft 46 is generally a bending stress. Thus, the first ducts 49 are generally aligned with the dominant stresses in the shaft 46, which reduces the likelihood of the first ducts 49 presenting a stress raiser problem.

The lug 42 includes a second duct 48. The second duct 48 is circumferential and extends lengthwise in a direction generally orthogonally with respect to the axis B of the bore defined by the bearing surface 44. The dominant stress in a lug is generally circumferential due to applied radial load placing the lug 42 in tension. Thus, the second duct 48 is generally aligned with the dominant stress in the lug 42, which reduces the likelihood of the second duct 48 presenting a stress concentration or stress raiser problem. The second duct 48 extends depth-wise into the lug through the lug coating 44. This enables the second ducts to be deeper than the coating, which may improve grease transfer.

It is advantageous to provide the first ducts in the shaft 46 rather than the lug 42 because, if corresponding ducts 49 were provided in the lug 42, the first ducts 49 would extend so as to be generally orthogonal with respect to the dominant stress in the lug 42, meaning that the first ducts 49 would provide a stress raiser problem in the lug 42.

A supply of lubricant 50 such as grease is supplied to the ducts 48, 49 through a hole 47 in the lug 42 in a conventional manner. The ducts 48, 49 are open topped to enable grease to be exchanged between the first duct 48 and the plurality of second ducts 49.

In embodiments of the invention the lug coating may have a thickness of at least 0.05 mm. The lug coating may have a thickness between 0.1 mm and 10 mm, preferably between 0.1 mm and 5 mm, more preferably between 0.1 mm and 3 mm and even more preferably between 0.1 mm and 1 mm. A thickness of 0.1 mm provides for a reasonable amount of wear, but anything above 0.3 mm is likely to be outside the amount of wear expected in most embodiments. It may however be advantageous for the lug coating to be up to 1 mm to allow for edge wear.

In embodiments of the invention a coating such as the lug coating may be applied by any suitable technique, such as electroplating, or metal spraying or thermal spraying such as plasma or high velocity oxygen fuel (HVOF) thermal spraying.

In embodiments of the invention the ducts may have any suitable configuration which enables grease transfer without adversely affecting the strength of the lug and shaft; the ducts may be of conventional size, such as semicircular cross section of 1.5 mm radius, or generally rectangular cross section 2 to 5 mm wide and 0.5 to 1 mm deep, and may be formed by any suitable conventional technique, such as machining. Some detail shaping, such as semi-hemispherical ends, or other tapering shapes may be provided to reduce any local stress raiser effects at the groove ends.

In embodiments of the invention one or more first ducts may be provided in the shaft and arranged to extend so as to be generally parallel with respect to the dominant stress in the shaft. This may refer to the portion of the shaft disposed within the lug. When the dynamic bearing is arranged such that the dominant load experienced by the shaft is a bending moment, the dominant stress angle in the shaft will be generally parallel with respect to the longitudinal axis L of the shaft. Thus, in some embodiments, one or more first ducts may extend lengthwise generally parallel with respect to the longitudinal axis L of the shaft such that the first ducts are generally aligned with the dominant stresses in the shaft, which may reduce the likelihood of the first ducts presenting a stress raiser problem.

In embodiments of the invention where the dynamic bearing is arranged such that the shaft experiences combined bending and torsional moments, the stress angle in the shaft will be at a non-zero angle with respect to the longitudinal axis L of the shaft. Thus, in some embodiments, one or more first ducts may extend lengthwise at an angle of up to 45° with respect to the longitudinal axis L of the shaft such that the first ducts are generally aligned with the dominant stress in the shaft, taking account of both bending and torsion loading, which may reduce the likelihood of the first ducts presenting a stress raiser problem.

In embodiments where the dynamic bearing is arranged such that the shaft experiences just torsion, the dominant stress angle would be 45° with respect to the longitudinal axis L of the shaft and the first ducts may be arranged accordingly.

In embodiments of the invention one or more second ducts may be provided in the lug and arranged to extend so as to be generally parallel with respect to the dominant stress in the lug and in come cases the lug coating also. One or more of second ducts may extend at an angle of up to $Tan^{-1}$=(lug width−3× groove width)/lug bore diameter, in some embodiments up to 15°, in some embodiments up to 10° and in some embodiments up to 5° from a plane perpendicular with respect to the bore axis B.

In embodiments of the invention the shaft may comprise an elongate member, such as a bar or hollow pipe. At least the portion of the shaft arranged to be received by the lug may be generally cylindrical.

In embodiments of the invention the shaft may be coated to improve its hardness; for example, a coating comprising chromium, a carbide based coating such as WC—Co—Cr, nickel or nickel alloy, or diamond like carbon. In such embodiments, it is preferred that the shaft coating is not applied to the first ducts due to the detrimental effect that the plating process may have on the fatigue resistance of the shaft.

In embodiments of the invention the first material may comprise a relatively hard metal such as steel, titanium or a nickel chrome alloy. In some embodiments the first material may comprise a high strength corrodible steel which is plated for harder coating and corrosion protection as described in the preceding paragraph. Stainless steel is preferred if the shaft is not coated.

In embodiments of the invention the second material may comprise a relatively soft material; for example, a metal such as aluminium bronze, aluminium-nickel-bronze, bronze, or other copper alloys, or 'white metal' families of alloys. In some embodiments the second material may comprise a self lubricating material; for example a self lubricating material containing PTFE, graphite or molybdenum sulphide.

Thus, in embodiments of the invention the bearing surface is either provided by the lug itself, or by a coating that is applied to the lug. As such, a dynamic bearing according to embodiments of the invention does not require a bush to be provided between the shaft and the lug. The inventor has found that the interface between a coating and the lug is less likely to result in rotation or migration of the bearing surface. The dynamic bearing according to the first aspect may therefore provide for a more robust dynamic bearing that may be lighter than prior art bearings due to it not including a bush. Moreover, the corrosion resistance of the bearing may be improved due to the removal of the lug-bush interface, which is a primary location for corrosion and fretting of the lug. Moreover, the dynamic bearing according to the first aspect may have improved electrical conductivity across the bearing relative to prior art bearings including a lug-bush interface, which is advantageous for lightning protection.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. An aircraft landing gear assembly comprising:
a landing gear structural component;
a lug, the lug comprising a unitary component of the structural component, the lug defining a first bore which extends through the lug;
a shaft comprising a first material; and
a bearing surface comprising a second material that is softer than the first material, the bearing surface defining a second bore and being arranged to support the shaft when the shaft is movably housed within the bore in use,
wherein the bearing surface is defined by a coating applied to the first bore of the lug, and
wherein the second material comprises a metal alloy.

2. The aircraft landing gear assembly according to claim 1, wherein the shaft includes one or more first ducts which open onto a surface of the shaft and are arranged for the passage of lubricant.

3. The aircraft landing gear assembly according to claim 2, wherein one or more of the first ducts are arranged to extend so as to be parallel to a longitudinal axis of the shaft.

4. The aircraft landing gear assembly according to claim 2, wherein one or more of the first ducts are arranged to extend lengthwise at an angle of up to 45° with respect to a longitudinal axis of the shaft.

5. The aircraft landing gear assembly according to claim 2, wherein the one or more first ducts comprise a plurality of first ducts disposed in a parallel arrangement around the peripheral surface of the shaft.

6. The aircraft landing gear assembly according to claim 2, wherein the shaft in use has a loaded surface portion carrying tension stress substantially parallel to a longitudinal axis of the shaft, and an unloaded surface portion carrying compression stress substantially parallel to the longitudinal axis of the shaft, and the first ducts are provided in side portions between the centres of the loaded and unloaded surface portions.

7. The aircraft landing gear assembly according to claim 2, wherein the first ducts are open topped ducts.

8. The aircraft landing gear assembly according to claim 2, wherein the ducts are lubricant ducts for the distribution of lubricant.

9. The aircraft landing gear assembly according to claim 8, wherein the lubricant ducts are coupled to a source of lubricant.

10. The aircraft landing gear assembly according to claim 1, wherein the bearing surface includes one or more second ducts for the passage of lubricant.

11. The aircraft landing gear assembly according to claim 10, wherein one or more of the second ducts are arranged to extend so as to be orthogonal to an axis of the bore defined by the bearing surface.

12. The aircraft landing gear assembly according to claim 10, wherein one or more of the second ducts extend lengthwise in a non-parallel direction with respect to an axis of the bore defined by the bearing surface.

13. The aircraft landing gear assembly according to claim 10, wherein one or more of the second ducts extend depthwise into the lug through the coating.

14. The aircraft landing gear assembly according to claim 10, wherein the second ducts are open topped ducts and wherein the second ducts are lubricant ducts for the distribution of lubricant.

15. The aircraft landing gear assembly according to claim 1, wherein the coating has a thickness of at least 0.05 mm.

16. The aircraft landing gear assembly according to claim 1, wherein portions of the lug and/or coating defining extremities of the bore are tapered to spread edge loading.

17. The aircraft landing gear assembly according to claim 1, wherein the second material comprises a self lubricating material.

18. The landing gear assembly according to claim 1, wherein the unitary component is formed from a single piece of a material.

19. The landing gear assembly according to claim 1, wherein the second material comprises aluminium bronze, aluminium-nickel-bronze, bronze, a copper alloy or a white metal alloy.

20. The landing gear assembly according to claim 1, wherein the coating is applied by electroplating or metal spraying.

* * * * *